US011837238B2

(12) United States Patent
Pelecanos et al.

(10) Patent No.: US 11,837,238 B2
(45) Date of Patent: Dec. 5, 2023

(54) ASSESSING SPEAKER RECOGNITION PERFORMANCE

(71) Applicant: Google LLC, Mountain View, CA (US)

(72) Inventors: Jason Pelecanos, Mountain View, CA (US); Pu-sen Chao, Mountain View, CA (US); Yiling Huang, Mountain View, CA (US); Quan Wang, Hoboken, NJ (US)

(73) Assignee: Google LLC, Mountain View, CA (US)

( * ) Notice: Subject to any disclaimer, the term of this patent is extended or adjusted under 35 U.S.C. 154(b) by 185 days.

(21) Appl. No.: 17/076,743

(22) Filed: Oct. 21, 2020

(65) Prior Publication Data

US 2022/0122614 A1 Apr. 21, 2022

(51) Int. Cl.
*G10L 17/12* (2013.01)
*G06N 3/08* (2023.01)
(Continued)

(52) U.S. Cl.
CPC .............. *G10L 17/12* (2013.01); *G06N 3/045* (2023.01); *G06N 3/08* (2013.01); *G10L 17/18* (2013.01); *G10L 25/30* (2013.01); *G10L 25/51* (2013.01)

(58) Field of Classification Search
CPC ......... G10L 17/12; G10L 17/18; G10L 25/30; G10L 25/51; G06N 3/08; G06N 3/04; G06N 3/0454
See application file for complete search history.

(56) References Cited

U.S. PATENT DOCUMENTS 9,843,668 B2 * 12/2017 Hodge .................... H04M 3/00
10,438,584 B2 * 10/2019 Ni ........................... G10L 15/00
(Continued)

FOREIGN PATENT DOCUMENTS

| EP | 2821992 A1 | 1/2015 |
|---|---|---|
| KR | 100792016 B1 | 1/2008 |

OTHER PUBLICATIONS

Quality Measures for Speaker Verification with Short Utterances, Arnab Poddar, Jan. 29, 2019.
(Continued)

*Primary Examiner* — Richemond Dorvil
*Assistant Examiner* — Ethan Daniel Kim
(74) *Attorney, Agent, or Firm* — Honigman LLP; Brett A. Krueger; Grant Griffith

(57) ABSTRACT

A method for evaluating a verification model includes receiving a first and a second set of verification results where each verification result indicates whether a primary model or an alternative model verifies an identity of a user as a registered user. The method further includes identifying each verification result in the first and second sets that includes a performance metric. The method also includes determining a first score of the primary model based on a number of the verification results identified in the first set that includes the performance metric and determining a second score of the alternative model based on a number of the verification results identified in the second set that includes the performance metric. The method further includes determining whether a verification capability of the alternative model is better than a verification capability of the primary model based on the first score and the second score.

24 Claims, 9 Drawing Sheets

(51) Int. Cl.
  *G10L 17/18*   (2013.01)
  *G10L 25/30*   (2013.01)
  *G10L 25/51*   (2013.01)
  *G06N 3/04*    (2023.01)
  *G06N 3/045*   (2023.01)

(56) References Cited

U.S. PATENT DOCUMENTS

| | | |
|---|---|---|
| 2003/0225719 A1 | 12/2003 | Juang et al. |
| 2017/0116986 A1 | 4/2017 | Weng et al. |
| 2018/0144615 A1* | 5/2018 | Kinney .................. G08B 29/02 |
| 2019/0027152 A1* | 1/2019 | Huang ................... G10L 17/22 |
| 2021/0090578 A1* | 3/2021 | Trapp ..................... G10L 17/24 |
| 2021/0124881 A1* | 4/2021 | Li ........................... G06F 40/58 |
| 2021/0319085 A1* | 10/2021 | Frenkel .................. G06F 21/32 |

OTHER PUBLICATIONS

Robustness-Related Issues in Speaker Recognition, Zhen, Jul. 9, 2020.
International Search Report and Written Opinion related to Application No. PCT/US2021/055826, dated May 3, 2022.

* cited by examiner

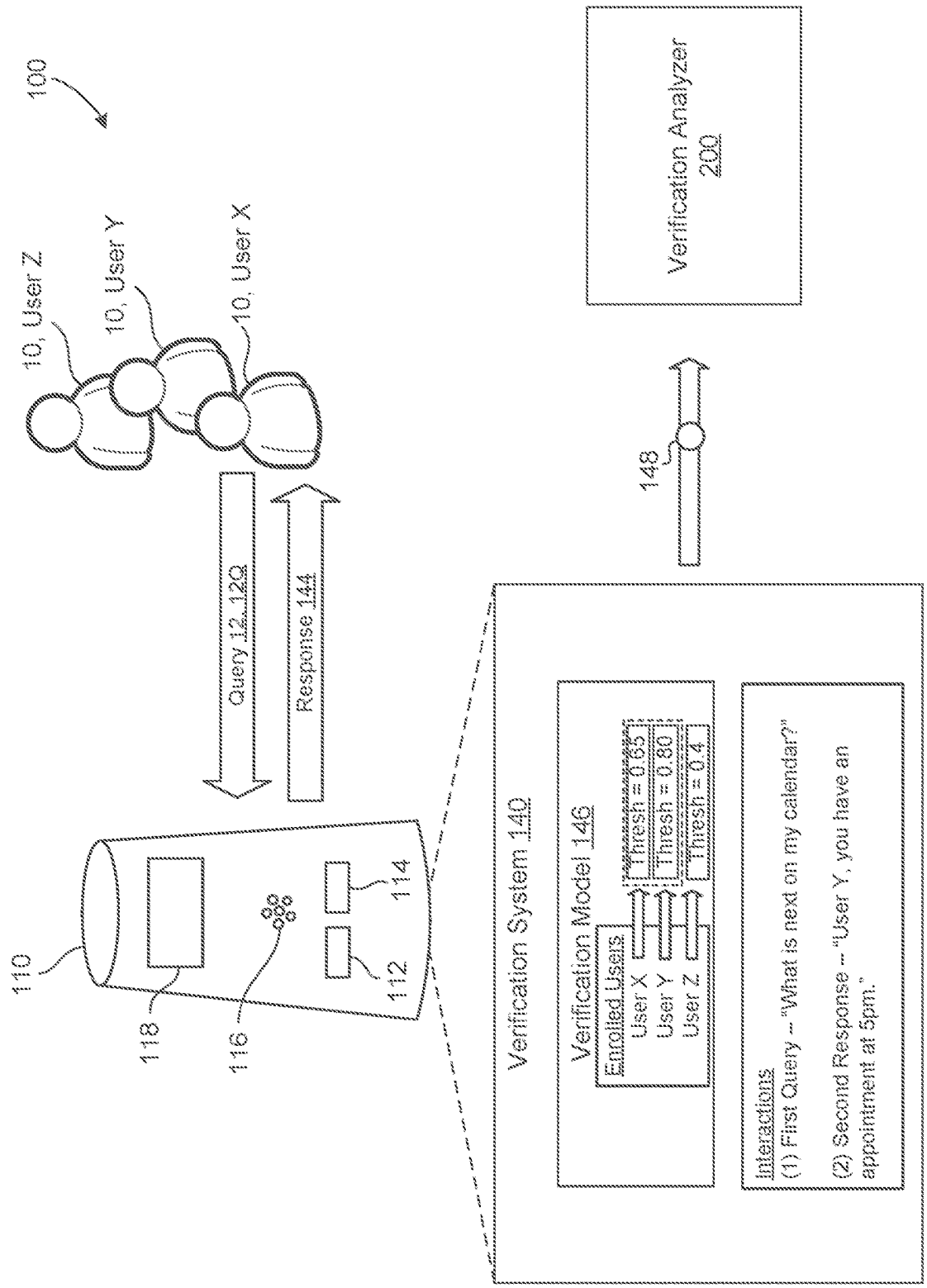

ASSESSING SPEAKER RECOGNITION PERFORMANCE

TECHNICAL FIELD

This disclosure relates to assessing speaker recognition performance.

BACKGROUND

Recently, computing devices that provide multiple user input modalities have become more prevalent. For example, smartphones and other user devices include speech recognition services that allow users to provide voice inputs to a device as an alternative to typing or pointing inputs. Voice-based inputs may be more convenient in some circumstances as a hands-free means for interacting with the computing device. Some devices require that a user's identity be verified before performing an action based upon voice input, in order to guard against breaches of privacy and security.

SUMMARY

One aspect of the disclosure provides a method of evaluating the performance of a verification model. The method includes receiving, at data processing hardware, a first set of verification results where each verification result in the first set of verification results indicates whether a primary verification model executing on a respective user device verifies an identity of a respective user as one of one or more registered users of the respective user device during a respective interaction between the respective user and the respective user device. The method also includes receiving, at the data processing hardware, a second set of verification results where each verification result in the second set of verification results indicates whether an alternative verification model executing on a respective user device verifies an identity of a respective user as one of one or more registered users of the respective user device during an interaction between the respective user and the respective user device. The method further includes identifying, by the data processing hardware, each verification result in the first and second sets of verification results that includes a performance metric indicating that the respective one of the primary verification model or the alternative verification model was one of able or unable to verify the identity of the respective user as the one of the one or more registered users during the respective interaction between the respective user and the respective user device. The method additionally includes determining, by the data processing hardware, a first performance score of the primary verification model based on a number of the verification results identified in the first set of verification results that include the performance metric. The method also includes determining, by the data processing hardware, a second performance score of the alternative primary verification model based on a number of the verification results identified in the second set of verification results that include the performance metric. The method further includes determining, by the data processing hardware, whether a verification capability of the alternative verification model is better than a verification capability of the primary verification model based on the first performance score and the second performance score. The method also includes, when the verification capability of the alternative verification model is better than the verification capability of the primary verification model, replacing, by the data processing hardware, the primary verification model executing on at least one respective user device with the alternative verification model.

Implementations of the disclosure may include one or more of the following optional features. In some implementations, the method also includes receiving, at the data processing hardware, a third set of verification results where each verification result in the third set of verification results indicates whether a control verification model executing on a respective user device verifies an identity of a respective user as one of one or more registered users of the respective user device during a respective interaction between the respective user and the respective user device. In these implementations, the method further includes identifying, by the data processing hardware, each verification result in the third set of verification results that includes the performance metric indicating that the control verification model was the one of able or unable to verify the identity of the respective user during the respective interaction between the respective user and the respective user device. In these implementations, the method additionally includes determining, by the data processing hardware, a third performance score of the control verification model based on a number of the verification results identified in the third set of verification results that include the performance metric and determining, by the data processing hardware, whether the verification capability of the alternative verification model is better than the verification capability of the control verification model based on the second performance score and the third performance score. In these implementations, replacing the primary verification model executing on each respective user device with the alternative verification model includes replacing the primary verification model executing on each respective user device with the alternative verification model when the verification capability of the alternative verification model is better than the verification capabilities of both the primary verification model and the control verification model.

In some examples, the method includes initially assigning, by the data processing hardware, the primary verification model to execute on a first plurality of user devices and the alternative verification model to execute on a second plurality of user devices. In these examples, replacing the primary verification model executing on at least one respective user device includes reassigning the alternative verification model to execute on at least one respective user device in the first plurality of user devices in place of the primary verification model. The first plurality of user devices may be greater than the second plurality of user devices.

Another aspect of the disclosure provides a system for evaluating the performance of a verification model. The system includes data processing hardware and memory hardware in communication with the data processing hardware. The memory hardware stores instructions that when executed on the data processing hardware cause the data processing hardware to perform operations. The operations include receiving a first set of verification results where each verification result in the first set of verification results indicates whether a primary verification model executing on a respective user device verifies an identity of a respective user as one of one or more registered users of the respective user device during a respective interaction between the respective user and the respective user device. The operations also include receiving a second set of verification results where each verification result in the second set of verification results indicates whether an alternative verification model executing on a respective user device verifies an identity of a respective user as one of one or more registered users of the respective user device during an interaction between the respective user and the respective user device. The operations further include identifying each verification result in the first and second sets of verification results that includes a performance metric indicating that the respective one of the primary verification model or the alternative verification model was one of able or unable to verify the identity of the respective user as the one of the one or more registered users during the respective interaction between the respective user and the respective user device. The operations additionally include determining a first performance score of the primary verification model based on a number of the verification results identified in the first set of verification results that include the performance metric. The operations also include determining a second performance score of the alternative primary verification model based on a number of the verification results identified in the second set of verification results that include the performance metric. The operations further include determining whether a verification capability of the alternative verification model is better than a verification capability of the primary verification model based on the first performance score and the second performance score. The operations also include, when the verification capability of the alternative verification model is better than the verification capability of the primary verification model, replacing the primary verification model executing on at least one respective user device with the alternative verification model.

In some implementations, the operations also include receiving a third set of verification results where each verification result in the third set of verification results indicates whether a control verification model executing on a respective user device verifies an identity of a respective user as one of one or more registered users of the respective user device during a respective interaction between the respective user and the respective user device. In these implementations, the operations further include identifying each verification result in the third set of verification results that includes the performance metric indicating that the control verification model was the one of able or unable to verify the identity of the respective user during the respective interaction between the respective user and the respective user device. In these implementations, the operations additionally include determining a third performance score of the control verification model based on a number of the verification results identified in the third set of verification results that include the performance metric and determining, by the data processing hardware, whether the verification capability of the alternative verification model is better than the verification capability of the control verification model based on the second performance score and the third performance score. In these implementations, replacing the primary verification model executing on each respective user device with the alternative verification model includes replacing the primary verification model executing on each respective user device with the alternative verification model when the verification capability of the alternative verification model is better than the verification capabilities of both the primary verification model and the control verification model.

In some examples, the operations include initially assigning the primary verification model to execute on a first plurality of user devices and the alternative verification model to execute on a second plurality of user devices. In these examples, replacing the primary verification model executing on at least one respective user device includes reassigning the alternative verification model to execute on at least one respective user device in the first plurality of user devices in place of the primary verification model. The first plurality of user devices may be greater than the second plurality of user devices.

Implementations of the system or the method may include one or more of the following optional features. In some implementations, none of the verification results received in the first and the second sets of verification results include a user identifier identifying the respective user. In some configurations, none of the verification results received in the first and second sets of verification results includes audio data associated with the respective interaction between the respective user and the respective device. Operationally, the primary verification model is trained on a first set of training data and the alternative verification model is trained on a second set of training data different than the first set of training data. The primary verification model may include a first neural network and the alternative verification model may include a second neural network having a different neural network architecture than the first neural network.

In some examples, the performance metric includes a false reject metric that indicates that the respective one of the primary verification model of the alternative verification model incorrectly rejected identifying the respective user as the one of the one or more registered users of the respective user device. The false metric may include one of: a punt metric that indicates that the respective one of the primary verification model or the alternative verification model authorized the respective user for guest privileges during the respective interaction with the respective user device; a double punt metric that indicates that the respective one of the primary verification model or the alternative verification model authorized the respective user for guest privileges during the respective interaction with the respective user device immediately subsequent to authorizing the same respective user for guest privileges during a previous respective interaction with the respective user device; and a punt and re-ask metric that indicates that the respective one of the primary verification model or the alternative verification model authorized the respective user for guest privileges during the respective interaction with the respective user device when the respective interaction corresponds to the respective user requesting authorized privileges immediately after the respective one of the primary verification model or the alternative verification model authorized the same respective user for guest privileges during a previous respective interaction with the respective user device.

In some implementations, the performance metric includes a false accept metric indicating that the respective one of the primary verification model or the alternative verification model incorrectly accepted the respective user as the one of the one or more registered users of the respective user device. Here, the false accept metric may include a proxy imposter acceptance metric indicating that the respective one of the primary verification model or the alternative verification model determined a respective verification score associated with at least two registered users of the respective user device that satisfied a verification threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1A-1D are schematic views of example speech environments for a verification analyzer.

Like reference symbols in the various drawings indicate like elements.

DETAILED DESCRIPTION

Figure 1A:
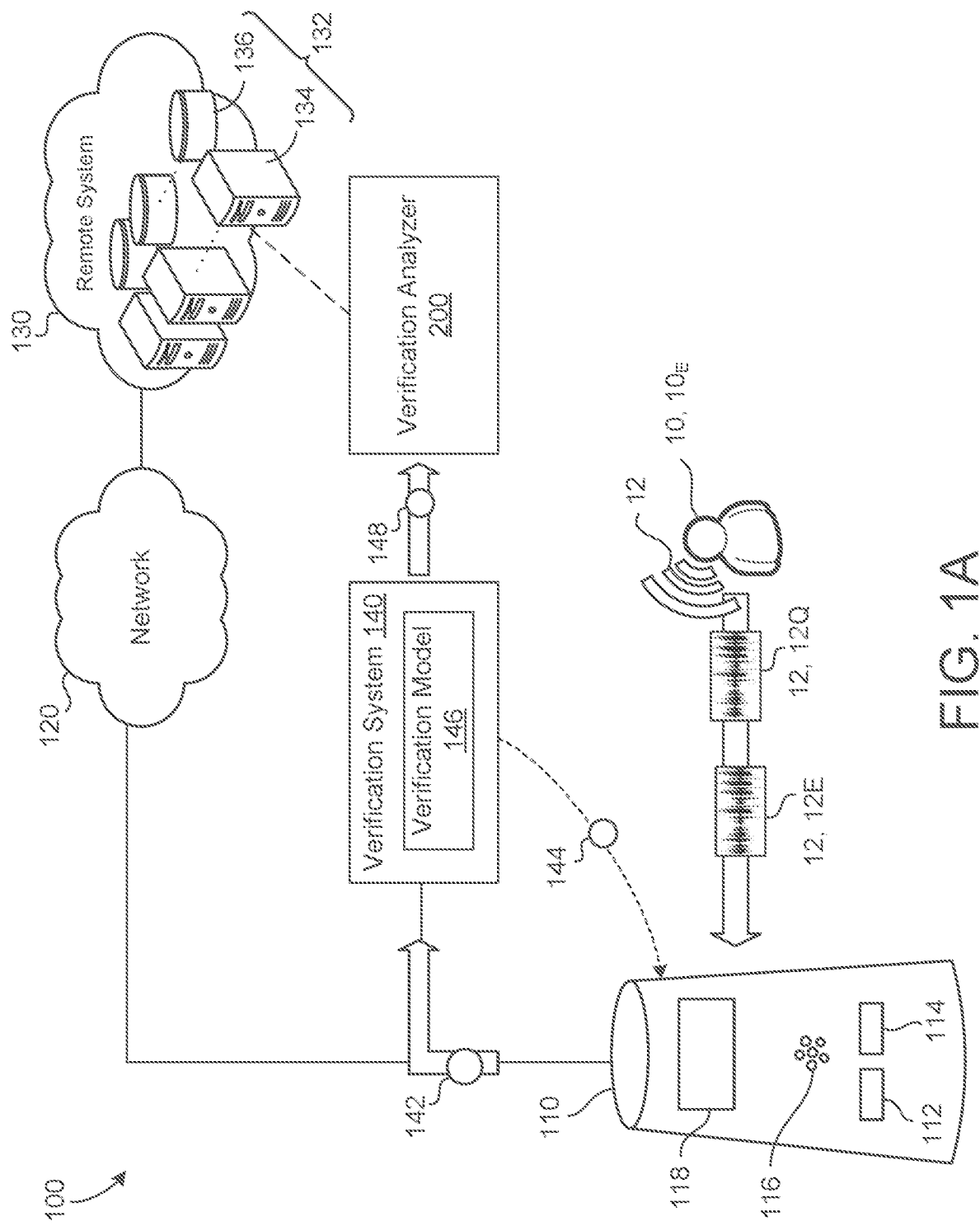

Generally, a verification process refers to a process of identifying whether an entity is authorized to perform some task or action based on one or more characteristics related to the entity. When the entity is a person, the characteristics involved in a verification process are often biomarkers of that person. For instance, a verification process uses audio features extracted from speech or audio spoken by a person to verify that he or she is authorized to perform a particular task. Besides speech, other examples of biomarkers that a verification process may use include fingerprints, retina features, facial features (e.g., in facial recognition), and/or handwriting (e.g., a signature). With any of these biomarkers, the verification process typically compares a current biomarker input to a prior biomarker input (i.e., an enrollment biomarker) in order to determine whether the current biomarker input matches, or closely resembles, the prior biomarker input. When the current biomarker input matches or closely resembles the prior biomarker input, the verification process considers the input of the current biomarker to verify the identity of the person; allowing the person to perform a particular task that requires identity verification.

A speaker recognition system may perform a verification process to verify whether two or more spoken utterances originated from the same speaker. To perform this verification, a verification system associated with the speaker recognition system compares audio samples (e.g., two audio samples) and determines whether a first audio sample corresponding to a first utterance spoken by a speaker matches or closely resembles a second audio sample corresponding to another spoken utterance. When the first utterance matches or closely resembles the other spoken utterance, the verification system identifies that both utterances are likely from the same speaker. On the other hand, when the first utterance fails to match or to closely resemble the other spoken utterance, the verification system identifies that each utterance is likely from a different speaker. In some examples, the speaker recognition system compares text-dependent audio samples for determining a match. In other examples the speaker recognition system compares two text-independent audio samples for determining whether the two audio samples are derived from a same speaker. Often times, to perform speaker verification, a user of a speaker recognition system provides one or more spoken utterances to the verification system in order to register or to enroll the user with the speaker registration system. A user that enrolls with the speaker registration system may be referred to as a "registered user", and as such, the terms 'enrolled user' and 'registered user' may be used interchangeably. By enrolling with the speaker recognition system, the enrollment of the user may authorize the user to perform certain tasks associated with the speaker recognition system. Moreover, enrollment of the user enables the verification system to use enrollment utterances (i.e., spoken utterances provided to enroll the user) to later verify an identity of the user. For instance, after enrolling as an authorized user of a computing device with a speaker recognition system, when the user submits a spoken utterance to the computing device, the speaker recognition system (e.g., the verification system) compares the submitted spoken utterance to one or more enrollment utterances to determine whether the user is an authorized user.

In order to perform verification, a verification system may use a verification model to generate a prediction of whether a speaker of an utterance is an authorized user or an unauthorized user. Yet unfortunately, an automated system is not without its flaws and the verification model may sometimes incorrectly identify the speaker of an utterance as an authorized user when the speaker is not an authorized user or as an unauthorized user when the speaker is an authorized user. When a system identifies a speaker of an utterance as an authorized user when the speaker is not an authorized user, this false identification is referred to as a false acceptance of the speaker. On the other hand, when a system identifies a speaker of an utterance as an unauthorized user when the speaker is actually an authorized user, this false identification is referred to as a false rejection of the speaker. Since a verification system may have some performance issues related to false acceptances and/or false rejects, it may be advantageous for a provider of a verification system to gather feedback on the performance of the verification system or to assess the performance of the verification system. But when a verification system is already in implementation (e.g., deployed on computing devices), evaluating the performance of the verification system becomes more complicated.

Traditional approaches to evaluate the performance of the verification system are typically cumbersome and/or include some degree of manual input for review to ensure that the verification system is being properly evaluated. In one such approach, volunteers may call in from various devices, identify themselves according to some identifier (e.g., a personal identification number (PIN)), and submit a recording that becomes labeled with the speaker identifier. With a collection of these recordings, the performance of the verification system (e.g., the verification model) may be evaluated using some number of these recordings to determine how well the verification system performs verification on known speaker identities. The drawback to this approach is that volunteers are generally paid for their time and the evaluation set recordings typically audited or cure did to ensure an accurate evaluation. This results can result in a costly and time-consuming process.

Another approach that may determine the performance of a verification system is an approach that gathers user data from devices using the verification system. In this approach, user data from devices using the verification system is also assigned a speaker identifier that masks any information about the user. For example, the approach assumes that audio from each device using the verification system relates to a particular speaker and assigns the audio a personal identification number (PIN) when the audio is collected to remove any user associations. Much like the call-in volunteer approach, the audio data gathered from devices using the verification system may then be used as an evaluation data set to evaluate the performance of the verification system. Yet rightly so, even when this process removes any user association and is predicated on user consent, a provider of a verification system does not want to assume control of user data and be held responsible for any potential security issues which may compromise the security of client data.

Furthermore, whenever a user or client provides its own data, even to a trustworthy source, the client relinquishes control of their data and risks being unable to prevent any downstream issues (e.g., security issues) with this data. Therefore, this approach suffers from the reality that a single device may include multiple users or speaker, but also implicate privacy and/or security issues.

To overcome the issues plaguing various techniques to evaluate the performance of a verification system, the provider of a verification system may instead capitalize on information gathered about or during a verification process by the verification system. In other words, when the verification system verifies whether a speaker is an enrolled/authorized user, the verification process generates data (e.g., metadata) regarding the interaction between the speaker and the verification system. For instance, the verification process generates information similar to an event log for interactions during a verification session. To illustrate, an enrolled speaker may speak an utterance to the device to perform an action that requires authorization. Once the device receives this spoken utterance that requires authorization, the verification system determines whether the speaker is enrolled on the device and either allows the device to perform the function when the verification system verifies the speaker or generates some type of response that indicates the speaker cannot be verified. For this verification session, the device and/or the verification system may generate verification data that indicates that a verification process was initiated and that the speaker was either verified and accepted or not verified and rejected. By gathering verification data regarding the verification process, the verification data generated does not include an identity/identifier of the speaker or any audio data/features associated with the speaker, while still providing key insights as to the performance of the verification system. More specifically, the verification data may be used to construct metrics that indicate the performance of the verification system, and more specifically a verification model leveraged by the verification system, without sharing any personal or biometric data associated with the speaker. By using verification data divorced from user specific information and avoiding collecting additional evaluation audio data (e.g., through volunteer calls), this performance evaluation technique overcomes several drawbacks with traditional performance evaluation techniques.

FIGS. 1A-1D are examples of a speech environment 100 that includes one or more users 10 communicating a spoken utterance 12 to a verification device 110 (also referred to as a device 110 or a user device 110). The user 10 (i.e., speaker of the utterance 12) may speak the utterance 12 query or a command to solicit a response from the device 110. Similarly, the utterance 12, or at least a portion of the utterance 12, may include an invocation phrase (e.g., hotword, wake word, trigger phrase, etc.) that when detected by the device 110 triggers the device 110 to wake up from a sleep state and begin recording subsequent audio associated with a query or command to be processed by an automatic speech recognition (ASR) system running on the device 110 and/or a remote server. The device 110 is configured to capture sounds from one or more users 10 within the speech environment 100. Here, the audio sounds may refer to a spoken utterance 12 by the user 10 that functions as an invocation phrase, an audible query, a command for the device 110, or an audible communication captured by the device 110. Speech-enabled systems of the device 110 or associated with the device 110 may field the query for the command by answering the query and/or causing the command to be performed.

Here, the device 110 is configured to detect utterances 12 and to invoke a local or a remote ASR system. The device 110 may correspond to any computing device associated with the user 10 and capable of receiving audio signals corresponding to spoken utterances 12. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to utterance detection or some other form of utterance/speech processing (e.g., speaker verification).

In some examples, the device 110 includes one or more applications (i.e., software applications) where each application may utilize one or more speech processing systems (e.g., a speech recognition system, a text-to-speech system, a speaker recognition system, a verification system 140, etc.) associated with device 110 to perform various functions within the application. In some implementations, the device 110 may detect an utterance 12 and provide data characterizing the utterance 12 to the one or more speech processing systems. For instance, the device 110 includes a verification application configured to verify whether the speaker 10 of an utterance 12 is an authorized user. For instance, the verification application performs a speaker verification process that involves accepting or rejecting an identity claim of a speaker 10 based on characteristics (i.e., audio features) of the speaker's voice, as determined by one or more utterances 12 from the speaker 10. In some examples, the device 110 is configured with the application locally to perform local speaker verification or remotely to utilize remote resources to perform some portion of speaker verification. The verification system 140 may perform text-dependent or text-independent speaker verification. Text-dependent speaker verification may be useful for recognizing a speaker from audio features extracted from an invocation phrase spoken by the speaker that is used to trigger the device 110 to wake from a sleep state.

The device 110 further includes an audio subsystem with an audio capturing device (e.g., a microphone) 116 for capturing and converting spoken utterances 12 within the speech environment 100 into electrical signals. While the device 110 implements a single audio capturing device 116 in the examples shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle. Additionally or alternatively, the device 110 also includes a speech output device (e.g., a speaker) 118 for communicating an audible audio signal from the device 110. For instance, the device 110 is configured to generate a synthesized playback signal in response to a detected utterance 12. In other words, an utterance 12 may correspond to a query that the device 110 answers with synthesized audio generated by the device 110 and communicated via the speech output device 118. To illustrate, the device 110 may respond to a detected utterance 12 with a synthesized playback signal that informs the speaker 10 that the verification process has verified his or her identity as an authorized user of the device 110.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing such as speech recognition and/or speaker identification/verification. For instance, the device 110 is configured to perform speaker recognition using a verification system 140. This system 140 may reside on the device 110 (referred to as on-device systems) or reside remotely (e.g., reside on the remote system 130), but in communication with the device 110. In some examples, some portions of the system 140 reside locally or on-device while others reside remotely. For instance, the verification model 146 that is configured to perform speech verification for the verification system 140 resides remotely or locally. In some examples, the verification system 140 may be combined with other speech processing systems such as speech recognition systems, diarization systems, text-to-speech systems, etc. In some configurations, the location of where the verification system 140 resides is based on processing requirements. For example, when the system 140 is rather large in size or processing requirements, the system 140 may reside in the remote system 130. Yet when the device 110 may support the size or the processing requirements of the system 140, the one or more systems 140 may reside on the device 110 using the data processing hardware 112 and/or the memory hardware 114.

The verification system 140 is generally configured to receive a verification query 142 from the device 110 on behalf of the user 10 and to provide a response 144 that indicates a result of a verification process performed by a verification model 146. In some examples, the verification model 146 receives, as input, the verification query 142 that requires verification and generates, as output, the response 144 as to whether the user 10 that submitted the verification query 142 to the device 110 is verified (i.e., the identity of the user 10 is an identity that is authorized to use the device 110 for the purpose of the verification query 142). Here, the verification system 140 is capable of performing a verification process for any type of biometric used for verification, including facial features (i.e., facial recognition), voice features (i.e., voice recognition), written features (i.e., handwriting recognition), etc. In some examples, such as FIGS. 1A-1D, the verification system 140 performs a speech verification process where the verification query 142 includes audio features characterizing a spoken utterance 12 and the verification system 140 provides the response 144 to the device 110 to indicate a result of the speech verification process performed by the verification model 146. The audio features may include d-vectors or i-vectors. In other words, the verification system 140 is configured to perform a speaker verification process using the verification model 146 to verify an identity of a speaker 10 of the utterance 12. For instance, the response 144 may indicate whether a speaker 10 is registered with the device 110 (i.e., a registered speaker) based on a spoken utterance 12 by the speaker 10.

Still referring to FIG. 1A, the device 110 may use the verification system 140 to enroll one or more users 10 with the device 110. By enrolling a user 10 with the device 110, the enrollment serves as a type of speaker registration process to identify an enrolled user 10, $10_E$ as an authorized or registered user of the device 110. The device 110 may be configurable such that an enrolled user $10_E$ of the device 110 may have access to, or have permissions to control, various functions of the device 110 while an unauthorized user 10 that is not enrolled with the device 110 is prohibited from performing one or more functions that the device 110 is capable of performing. Optionally, the device 110 may enroll multiple users 10. With multiple users 10, each enrolled user $10_E$ may configure a user account on the device 110 that has particular permissions or rights regarding functionality of the device 110. For example, a family that includes a husband, a wife, and a nine-year old daughter owns the device 110. Here, when each adult enrolls with the device 110, the adults may setup parental controls that allow each adult to access or to control all the functionality of the device 110, but restrict their daughter, who is also an enrolled user $10_E$, from having entire control of the device 110. For example, the parents setup their daughter's account to prevent their daughter from modifying home automation controls such as the thermostat schedule controlled by the device 110. This means that one enrolled user $10_E$ may have particular permissions or rights that overlap or are different from the permissions or rights of another enrolled user $10_E$. Moreover, instead of only generating permissions for enrollees, the device 110 may also be configured to designate permissions for a user 10 of the device 110 who is not an enrolled user $10_E$. For instance, when a user 10 of the device 110 is not an enrolled user $10_E$, the device 110 may be configured to perform limited functionality (e.g., a guest mode) or to entirely prevent the unenrolled user 10 from using the device 110. Without limitation, authorizing an enrolled user $10_E$ may permit the device 110 to access resources that only the enrolled user $10_E$ has permission to access. For instance, in a household with at least two enrolled users $10_E$, in which one speaks the voice command "Play my music playlist" captured by the device 110, the verification system 140 can identify the identity of the particular enrolled speaker $10_E$ and permit the device 110 to access the particular music playlist associated the identified speaker 10 and not the music playlists of the other enrolled users $10_E$.

In some configurations, the device 110 uses the verification system 140 to perform the enrollment process of enrolling a user 10 as a registered speaker for the device 110. For example, a speaker recognition application associated with the verification system 140 prompts a user 10 to speak one or more enrollment utterances 12, 12E from which a speaking signature can be generated for the user 10. In some implementations, the enrollment utterances 12E are short phrases of, for example, one, two, three, four, or more words. The verification system 140 may prompt the user 10 to speak pre-defined phrases as the enrollment utterances 12E, or the user 10 may spontaneously speak and provide enrollment utterances 12E based on phrases that that were not specifically provided for the user 10. In some examples, the user 10 may speak multiple enrollment utterances 12E where each enrollment utterance is the same phrase or a different phrase. The enrollment utterances 12E could include the user 10 speaking a predefined hotword configured to trigger the device 110 to wake-up from a sleep state for processing spoken audio received after the predefined hotword. While the example shows the users 10 providing the spoken enrollment utterance(s) 12E to the device 110, other examples may include one or more of the users 10 accessing the verification system 140 from another device (e.g., a smart phone) to provide the enrollment utterance(s) 12E.

In some examples, upon receiving the enrollment utterances 12E, the verification system 140 processes the enrollment utterances 12E to generate a speaker representation for each enrollment utterance 12E. The verification system 140 may generate a speaker signature for the user 10 from all, some, or one of the speaker representations for the enrollment utterances 12E. In some examples, the speaker signature is an average of the respective speaker representations for the multiple enrollment utterances 12E. In other examples, the speaker signature corresponds to a particular speaker representation from a particular enrollment utterance 12E that is selected based on one or more criteria (e.g., based on an audio or voice quality of the audio for the selected enrollment utterance 12E). Once a speaker signature is generated for a speaker 10, the speaker signature may be stored locally on the device 110 or stored in the remote system 130 (e.g., in the remote memory hardware 136).

After enrollment, when the device 110 detects a query utterance 12, 12Q by a user 10 within the speech environment 100, the verification system 140 is configured to identify whether or not the speaker 10 of the query utterance 12Q is an enrolled user $10_E$ of the device 110 based on the query utterance 12Q. A query utterance 12Q may refer to a special type of utterance or spoken phrase, such as a text-dependent verification phrase, or more generally refer text-independent phrases that may include any utterance 12 spoken by a user 10 subsequent to the completion of the enrollment process for one or more user 10. Here, a verification process performed by the verification model 146 identifies whether the speaker 10 of the detected query utterance 12Q is an enrolled user $10_E$ and generates the response 144 to indicate whether or not the speaker 10 is an enrolled user $10_E$. In some examples, the verification model 146 has access to speaker signatures, such as d-vectors or i-vectors, that have been generated for enrolled users $10_E$ and compares the detected query utterance 12Q by the speaker 10 to the speaker signatures to determine whether the query utterance 12Q corresponds to a particular speaker signature. In these examples, when the query utterance 12Q corresponds to a particular speaker signature, the verification system 140 determines that the query utterance 12Q was spoken by an enrolled user $10_E$ and generates a response 144 that indicates that the speaker 10 of the query utterance 12Q is an enrolled user $10_E$.

FIG. 1A illustrates a user that first enrolled with the device 110 by performing the enrollment process. In other words, FIG. 1A depicts at least one enrollment utterance 12E being sent to the device 110 by the user 10 to enroll with the device 110. Following the enrollment process, the user 10 speaks a query utterance 12Q to the device 110. When the device 110 receives the query utterance 12Q, the device 110 communicates the query utterance 12Q to the verification system 140 to enable the verification model 146 to verify that the speaker 10 is an enrolled user $10_E$. Here, when the verification model 146 verifies that the speaker 10 is indeed an enrolled user $10_E$, the verification system 140 communicates the response 144 to the device 110 to indicate that the speaker 10 is an enrolled user $10_E$ with the device 110. Once verified, the speaker 10 may use the device 110 or access some aspect of computing functionality offered by the device 110 that an enrolled user $10_E$ has permission to access or, more particularly, designated to the user 10. In some examples, the query utterance 12Q includes a hotword followed by a query. In these examples, the verification model 146 may verify the speaker 10 based on only a portion of the audio corresponding to the hotword, only a portion of the audio corresponding to the query, or the entire audio including both the hotword and the query. In additional examples, the query utterance 12Q may be a particular verification phrase that an enrolled user $10_E$ provides to the verification model 146 to verify the identity of the enrolled user $10_E$.

When the speaker 10 initiates this verification process performed by the model 146 of the verification system 140, a verification session has begun that may include one or more interactions between the speaker 10 and the verification system 140 (e.g., via the device 110). The verification system 140 is configured to record/log verification results 148 that indicate interaction events that occur during the verification process. Some examples of these interaction events that may be captured as verification results 148 include the receipt of a query 12Q for verification, rejection of a query 12Q, acceptance of a query 12Q, verification system 140 determinations (e.g., enrolled speaker probabilities), feedback from the speaker 10 regarding the verification process, or other verification log events. Here, an example of feedback from the speaker 10 that may generate a verification result 148 is when the speaker 10 subsequently interacts with results of the query 12Q. In other words, further interaction with the actual result of the query 12Q may indicate that the verification system 140 correctly verified the speaker 10 since the speaker 10 is engaging further with a response 144 to the query 12Q (e.g., clicking on search results or using functionality authorized by the verification system 140). Due to the nature of these verification results 148, these log events generally do not include any sensitive user information (e.g., user identifiers) and/or do not include the actual audio data corresponding to a query 12Q.

Figure 1B:
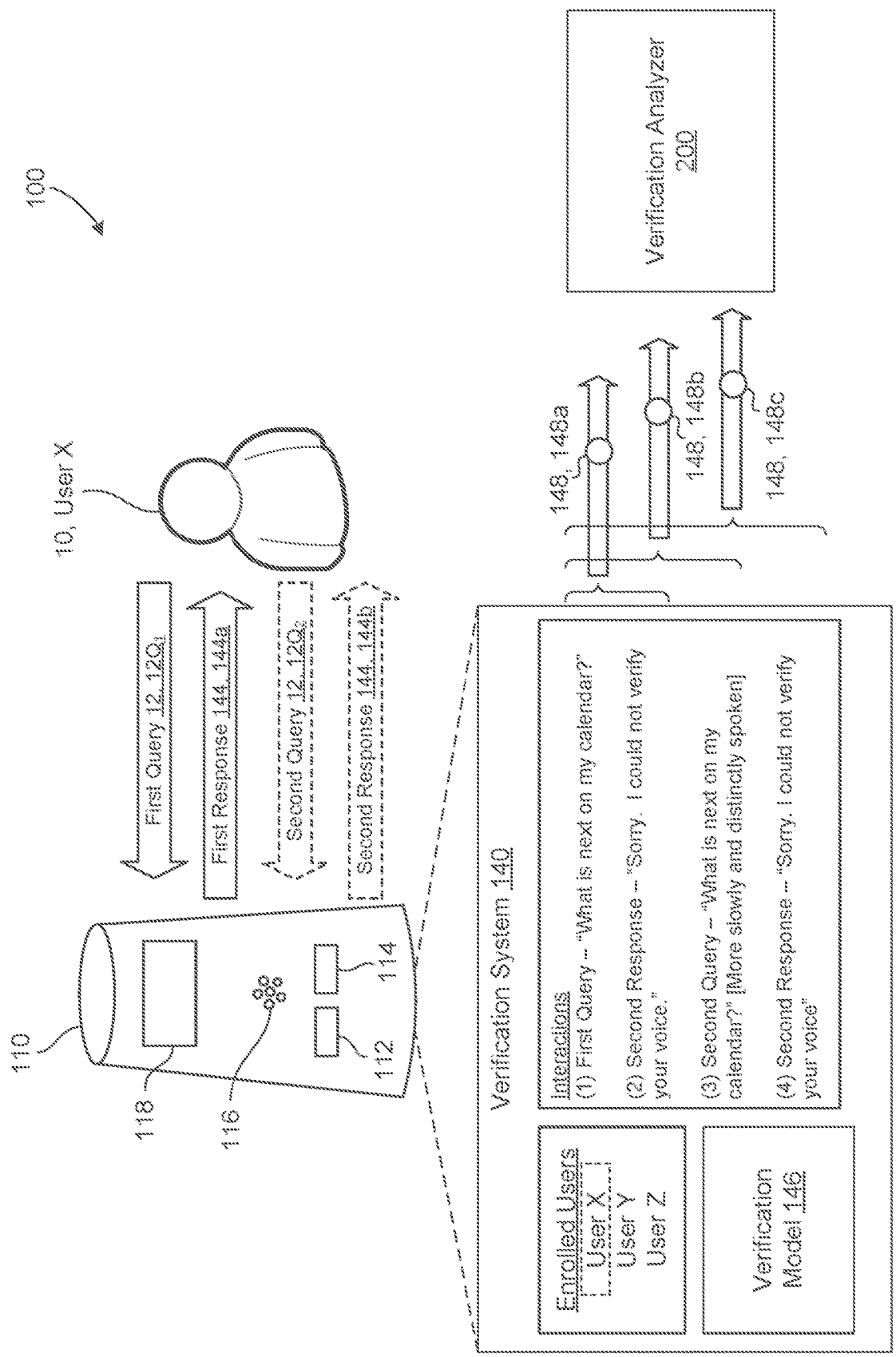

FIGS. 1B and 1C depict some verifications results 148 that may occur during the verification process by the verification system 140. In FIG. 1B, the verification system 140 illustrates that the device 110 includes three enrolled users $10_E$ shown as user X, user Y, and user Z. In this example, user X submits a query 12Q to the device 110 that states "What is next on my calendar?" In receiving this query 12Q, the device 110 and/or the verification system 140 may first determine whether the query utterance 12Q invokes the need for verification. An utterance 12 generally invokes the need for verification when the utterance includes, for example, a request for personal information stored on or accessible to the device 110, a request to perform a restricted function, or a request for other information that has been designated to require verification. For instance, in the prior example of the family of three, the father may have a music playlist that contains explicit lyrics that the father designates as requiring authorization so that his nine year old daughter is not exposed to the explicit lyrics. In some examples, the device 110 and/or the verification system 140 may perform a verification process for a query 12Q regardless of whether the query 12Q invokes the need for verification. That is, when a speaker 10 speaks to the device 110, the verification system 140 may initially determine whether the speaker 10 is an enrolled user $10_E$, but only enforces authorization when a spoken utterance 12 necessitates authorization enforcement. In FIG. 1B, the spoken utterance of "what is next on my calendar," is a query requesting personal calendar information. Here, the verification system 140 begins the verification process and attempts to verify the speaker, user X. Although user X is on a list of enrolled users, in this example, the verification system 140 fails to verify that the speaker 10, user X, is an enrolled user $10_E$. Based on this failure, the verification system 140 communicates a response 144 to the device 110 that in turn gets communicated to the speaker 10, user X to indicate the verification failure. The response 144 states "Sorry. I could not verify your voice." Since the speaker 10 is aware that he or she is an enrolled user $10_E$ of the verification system 140 for the device 110, the speaker 10 may submit a second query $12Q_2$ that, for example, tries to use increased diction to pronounce the same query 12Q a second time (i.e., re-ask the same query 12Q). As shown in FIG. 1B, this second query $12Q_2$ also proves unsuccessful since the verification system 140 fails to verify the voice of the speaker 10, user X and communicates this failure again as the second response 144, 144*b* that against states "Sorry. I could not verify your voice." During this unsuccessful verification session, the verification system 140 logs, as verification data, verification results 148 that occurred during the session. For instance, FIG. 1B illustrates three verification results 148, 148*a-c*. The first verification result 148*a* indicates a punt event that refers to an event where the verification system 140 (e.g., the verification model 146) did not recognize the speaker 10. The second verification result 148*b* indicates a punt and re-ask event where the speaker 10 was not recognized (i.e., punted), but the speaker 10 re-asked the same query $12Q_2$ again. The third verification result 148, 148*c* indicates a double punt event that refers to an event where, after verification failure (i.e., a punt) and a subsequent resubmission of the same query $12Q_2$ (i.e., a re-ask), the verification model 146 again failed to verify the speaker 10 (i.e., a double punt). In other words, each of these potential verification results 148*a-c* indicate a false reject since the speaker 10 is user X and user X is actually an enroller user $10_E$ of the verification system 140.

As another example, FIG. 1C illustrates a scenario where the verification result 148 is a false acceptance. One way to determine that the verification system 140 has an interaction event that is a false acceptance is when the verification system 140 has multiple enrolled users $10_E$. With multiple enrolled users $10_E$, when an utterance 12 is spoken by a speaker 10, the verification system 140 may determine what the likelihood is that the utterance 12 corresponds to each of the enrolled users $10_E$. For instance, the verification system 140 generates an enrollment score for each enrolled user 10E indicating a likelihood of whether the speaker 10 is the corresponding enrolled user $10_E$. When the enrollment score for an enrolled speaker $10_E$ satisfies an acceptance threshold score, the verification system 140 is configured to designate the speaker 10 as that particular enrolled user $10_E$. Although this is the ideal behavior of the verification system 140, sometimes the performance of the verification model 146 indicates that for a particular utterance 12Q, the verification model 146 determines that more than one enrolled user $10_E$ has a score that satisfies the acceptance threshold for the utterance 12Q. For example, two brothers in a household who are both enrolled users $10_E$ may have similar voice characteristics that are sometimes hard to distinguish for speaker verification. When this occurs, the verification result 148 indicates an impostor acceptance event referring to an event that is a determination by the verification system 140 that more than one enrolled users $12_E$ have a score that satisfies the acceptance threshold. It is called an imposter acceptance event because the speaker 10 is only a single enrolled user $10_E$, but the verification system 140 accepts the query utterance 12Q as an identity for more than one enroller user $10_E$. In other words, the accepted identity that is not actually speaking is an imposter. For example, FIG. 1C depicts that the threshold acceptance value is a value of 0.5 and that the query utterance 12Q results in a verification process that indicates more than one enrolled user $10_E$ may be the speaker 10. Here, the speaker 10 is user X and the verification model 146 indicates a score of 0.65 for user X, a score of 0.8 for user Y, and a score of 0.4 for user Z. In this example, because the score for user Y is the highest, the verification system 140 may return a result 144 saying "User Y, you have an appointment at 5 pm," such that the verification system 140 thinks that user Y (i.e., the imposter) spoke the utterance 12Q instead of user X.

Figure 1D:
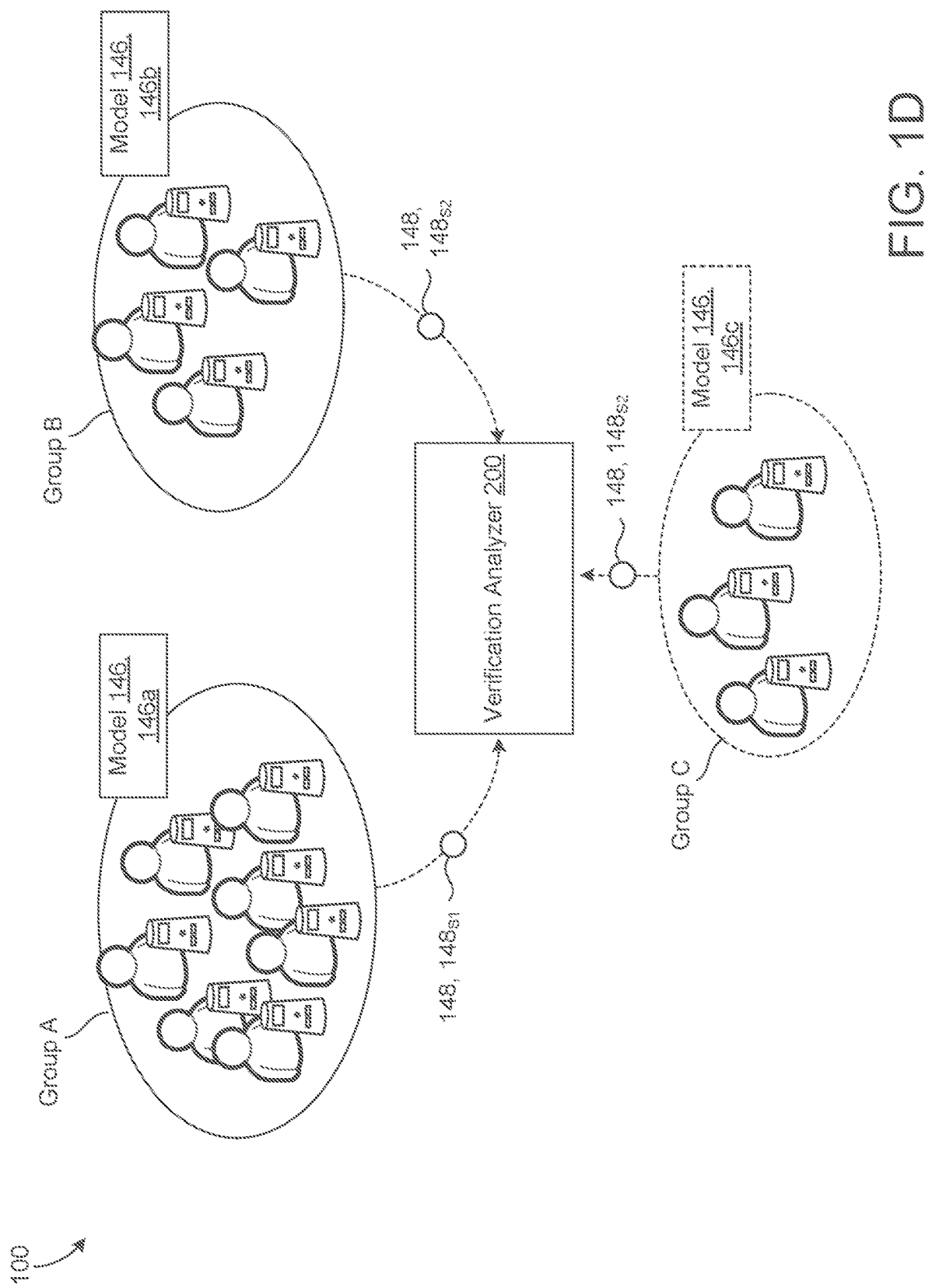

FIG. 1D illustrates that the verification system 140 may use one of several verification models 146 (e.g., shown as three verification models 142*a-c*) to determine whether a speaker 10 of an utterance 12 is an enrolled user $10_E$ of the device 10. Different models 146 may be used by the provider of the verification system 140 to test, to develop, to maintain, or to comparatively evaluate models 146. For instance, group A depicts several users 10 (e.g., seven users 10) with corresponding devices 110 that use a first verification model 142, 142*a* to perform the verification process. Group B depicts four users 10 with corresponding devices 110 that use a second verification model 142*b*. Group C depicts a three users 10 with corresponding devices 110 that use a third verification model 142*c* to perform the verification process. In this depicted example, the first verification model 146*a* may correspond to a production or primary model that has been deployed to a majority of users 10 of the verification system 140 and should generally be robust because it has stood the test of time. The second verification model 146*b* may correspond to an experimental or alternative model that a provider of the verification system 140 may use to develop improvements (e.g., fix verification bugs) for the verification process. For example, the verification model 146 uses a neural network to determine whether a speaker 10 of an utterance 12 is an enrolled user $10_E$. This neural network may have different types of neural network architecture. A production verification model, such as the first verification model 146*a*, may use one type of neural network architecture while the experimental verification model, such as the second verification model 146*b*, uses a different type of neural network architecture or an improvement/update to the neural network architecture of the first verification model 146*a*. Additionally or alternatively, in some implementations, each model 146 is generally trained by a set of training data to teach the model 146 to verify registered or enrolled identities. Therefore, the substance of the training data provided to each model 146 may have some impact on its performance. For at least this reason, the production verification model 146*a* may differ from the experimental verification model 146*b* in the fact that each model 146 has been trained on different sets of training data (e.g., verification training examples). The experimental verification model 146*b* may then be deployed in parallel with the production verification model 146*a* to identify whether any alterations to the training data improve the verification performance of a verification system 140 using the experimental verification model 146*b* when compared to the production verification model 146*a*. With a comparative model approach, two or more models 146 may be deployed to some set of users 10 and data in the forms of verification results 148 may be gathered about the verification process of each respective model 146 to allow a provider to compare and/or to evaluate the performance similarities and differences between these models 146. For instance, FIG. 1D illustrates that group A using the first model 146*a* generates a first set of verification results 148, $148_{S1}$, group B using the second model 146*b* generates a second set of verification results 148, $148_{S2}$, and group C using the third model 146c generates a third set of verification results 148, $148_{S3}$. When using a comparative model approach, the provider may route a majority of user traffic to the production verification model 146a to avoid deployment complications or any other issues that could occur with an experimental verification model 146b. Here, the production verification model 146a would be deployed to a majority of verification system users (i.e., deployed to a device 110 associated with a user 10 executing the verification system 140) while other model(s) 146 for comparison are deployed to a minority of verification system users (i.e., deployed to a device 110 associated with a user 10 executing the verification system 140).

In some examples, such as FIG. 1D, the verification system 140 uses more than two models 146 for comparative analysis. For example, FIG. 1D depicts group C using the third verification model 146c in a dotted line to indicate that the provider may optionally deploy more than two models for comparative analysis. Here, the third model 146, 146c is shown to illustrate the use of a control verification model 146. A control verification model 146 may refer to a redundant version of the production verification model 146 (e.g., the first verification model 146a) in order to confirm comparative results between the production model 146a and the experimental model 146b. In other words, comparative results between the production model 146a and the experimental model 146b may indicate some performance differences. By also comparing the performance results of the production model 146a or experimental model 146b to a control model 146c, a provider may be able to identify whether the performance differences are actually due to verification or some other issue with a model 146. For example, perhaps some number of production models 146a become corrupt or have a bug. Here, the performance of the production model 146a due to the bug may cause the experimental model 146b to appear better at the process of verifying a speaker 10. Yet when the experimental model 46b is compared to the control model 146c representing the production model 146a in an uncorrupted or state without a bug, the control model 146c indicates better performance than the experimental model 146b. This may indicate to a provider that the provider should not necessarily replace or mass deploy the experimental model 146b and/or that some additional issues may be present in the production model 146a.

Because the verification system 140 may use several different verification models 146, the enrollment process may be such that the user 10 becomes an enrolled user $10_E$ on each model 146 to enable each model 146 to be able to properly verify whether a speaker of an utterance 12 is an enrolled user $10_E$. Depending on the enrollment process, enrolling a user 10 on multiple models may range from being undetectable to the enrolling user 10 to the enrolling user 10 having to provide model specific enrollment (e.g., specific enrollment phrases). A user 10 may also have to seemingly re-enroll when a verification system 140 is updated or the verification model 146 undergoes changes that would impact a user's enrollment with the model 146. For example, based on comparative analysis, the provider decides to replace the first verification model 146a with a second verification model 146b. When this occurs the second verification model 146b may need to be deployed to the majority of users 10 to be the production model 146. In this situation, some number of user 10 may need to re-enroll or enroll for the first time on the second verification model 146b that is now the production model 146.

Figure 2A:
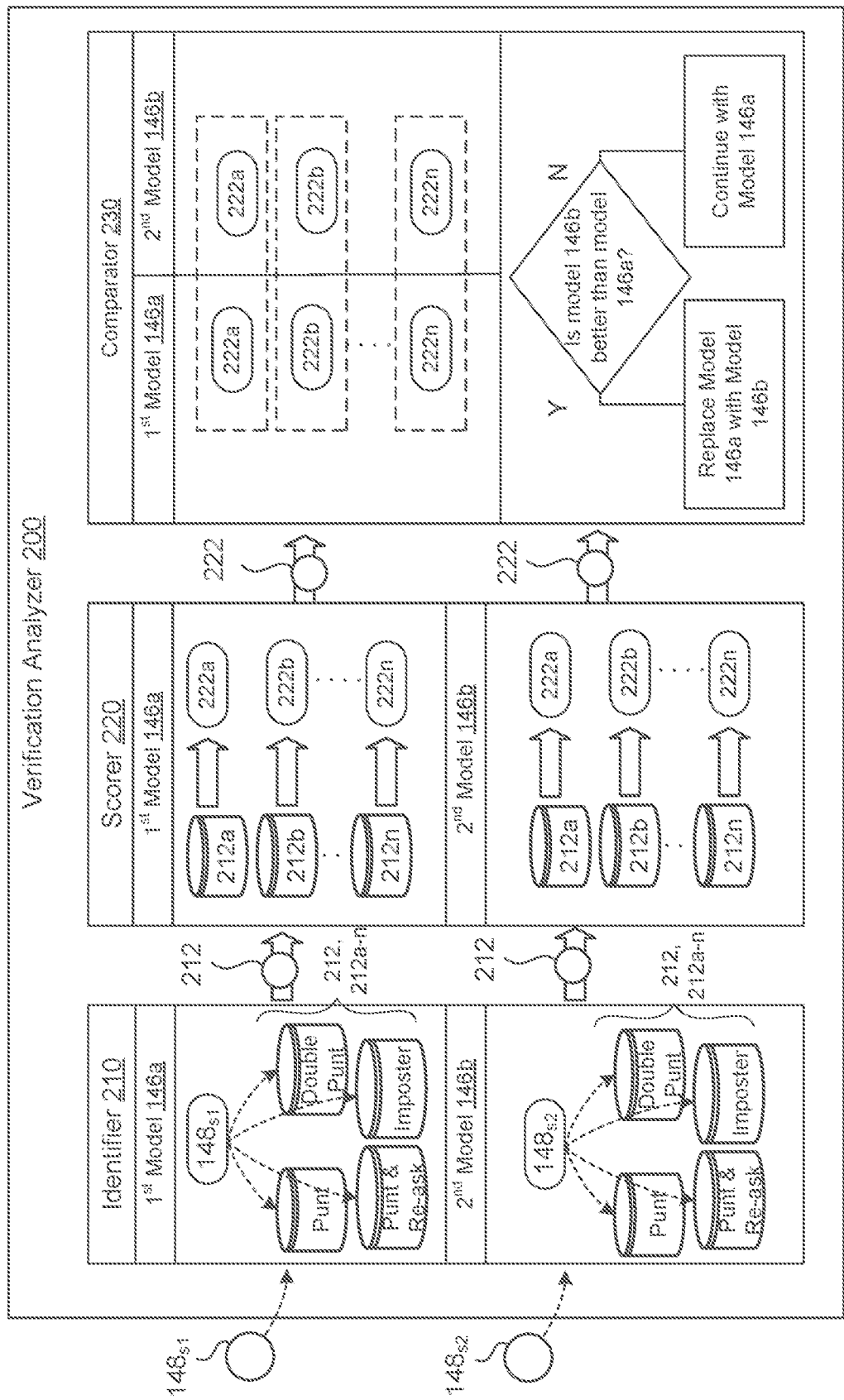
FIGS. 2A and 2B are schematic views of example verification analyzers for evaluating the performance of a verification model.
Figure 2B:
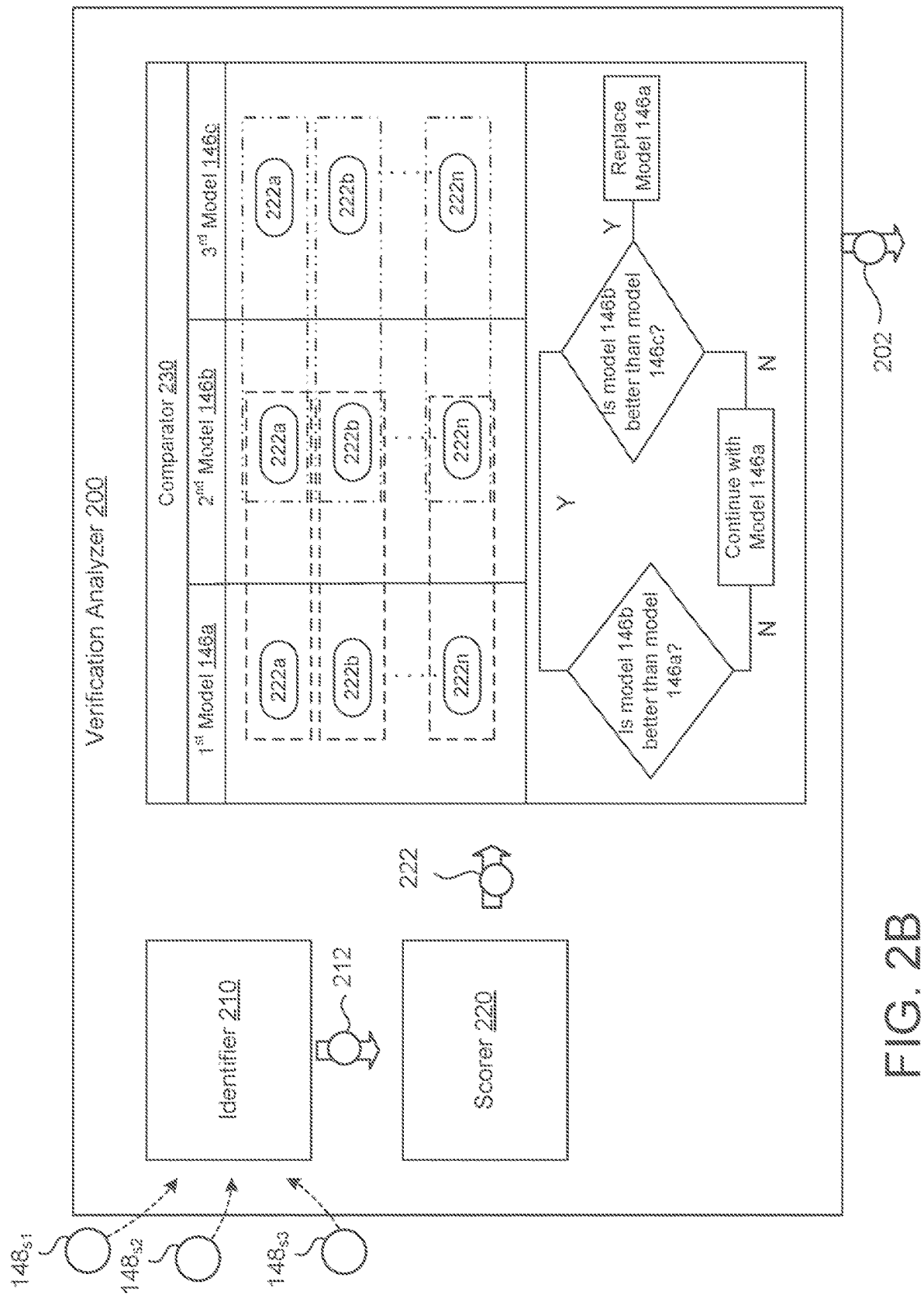

As shown in FIGS. 1A-1D, the speech environment 100 also includes a verification analyzer 200 (also referred to as the analyzer 200). The analyzer 200 is in communication with the verification system 140 and configured to analyze the performance of one or more verification models 146. For instance, even though FIGS. 2A and 2B illustrate the analyzer 200 analyzing the performance of two and three models 146 respectively, the analyzer 200 is scalable to perform analysis on any number of models 146 (e.g., even a single model 146). The analyzer 200 may be located locally (e.g., on a user device 110) and configured to communicate its analysis to a provider of the verification system 140 (e.g., via the network 120) or to be located remotely (e.g., in the remote system 130) and in communication with the provider. In some examples, some portions of the analyzer 200 may be located locally while other portions are located remotely. The analyzer 200 is configured to receive verification results 148, as input, and to generate a performance comparison 202, as output. In some examples, the performance comparison 202 triggers some action to be taken in relation to the models 146 that the analyzer 200 compares. For instance, the analyzer 200 is configured to adjust the deployment of different models 146 to one or more groups of user 10. In other words, the analyzer 200 may replace the primary or production verification model 146a with an experimental or alternative verification model 146b when the experimental verification model 146b proves to have better performance verification capability than the production verification model 146a.

Whether analyzing a single model 146 or performing comparative analysis on two or more models 146, the analyzer 200 receives a set of verification results $148_S$ from each model 146 that it intends to analyze. Referring to FIGS. 2A and 2B, the analyzer 200 includes an identifier 210, a scorer 220, and a comparator 230. The identifier 210 is configured to receive the verification results 148 and to identify each verification result 148 that corresponds to a particular performance metric 212. Here, a performance metric 212 may refer to a particular interaction event that occurred during a verification session that provides some indication of whether a model 146 was able to or unable to verify an identity of a user 10 as one or more registered or enrolled users $10_E$. For example, the performance metric 212 corresponds to a false reject event or a false accept event during a verification session. As previously stated, some examples of a false reject event include a punt, a double punt, a punt and re-ask while an example of a false accept event is an imposter accept. Note that other similar performance metrics 212 are possible to indicate a false reject event or a false accept event at a verification model 146. As shown in FIG. 2A, the identifier 210 sorts the verification results 148 into one or more corresponding performance metrics 212, 212a-n.

After identifying verification results 148 that correspond to one or more performance metrics 212, the identifier 210 communicates one or more performance metrics 212a-n to the scorer 220. The scorer 220 receives one or more performance metrics 212a-n from the identifier 210 and is configured to determine a score 222 based on a number of verification results 148 that includes a given performance metric 212. For example, the scorer 220 is able to determine a score 222 for each different type of performance metric 212. When the scorer 220 determines a score 222, the score 222 is catered to a particular model 146. In other words, the score 222 forms a representation of a particular model's performance for a given performance metric 212 since each set of verification results $148_S$ corresponds to a given verification model 146. To illustrate, FIG. 2A depicts that the scorer 220 generates a first score 222, 222a for a first performance metric 212a for the first model 146a, a second score 222, 222b for a second performance metric 212b for the first model 146a, and an nth score 222, 222n for a nth performance metric 212n for the first model 146a. Since in FIG. 2A, the analyzer 200 is comparing two models 146a-b (e.g., a primary verification model 146a and an alternative verification model 146b), the scorer 220 generates a score 222 for the same performance metric(s) 212, but with respect to another model's verification results 148 (i.e., a set of verification results $148_S$ from that particular model 146). In other words, the second model 146b may receive a score 222 from the scorer 220 regarding the same performance metrics 212 as the first model 146a. This means that the first model 146a receives a score 222 for a double punt metric 212 based on the set of verification results $146_{S1}$ from the first model 146a while the second model 146b receives a score 222 for a double punt metric 212 based on the set of verification results $146_{S2}$ from the second model 146b.

In some implementations, when the score 222 corresponds to a punt as the performance metric 212, the punt score 222 refers to a count of the number of punts within a particular set of verification results $148_S$ divided by a total number of verification results 148 within the set. For a score 222 that corresponds to a double punt as the performance metric 212, the double punt score 222 may refer to a count of the number of double punts within a particular set of verification results $148_S$ divided by a total number of verification results 148 within the set. When the score 222 corresponds to a punt and re-ask as the performance metric 212, the punt and re-ask score 222 may refer to a count of the combination of a punt and resubmission of the same query 12Q that was initially punted within a particular set of verification results $148_S$ divided by a total number of verification results 148 within the set. When the score 222 corresponds to an imposter accept as the performance metric 212, the impostor accept score 222 may refer to a percentage of queries 12Q with one or more enrolled user $10_E$ with an acceptance score threshold capable of verifying a user 10. Here, the percentage of queries 12Q is a count of the number of queries 12Q with one or more enrolled user $10_E$ with an acceptance score threshold capable of verifying a user 10 within a particular set of verification results $148_S$ divided by a total number of queries 12Q within the set.

In some examples, the scorer 220 generates a score 222 for a verification model 146 based on one or more relationships between the types of performance metrics 212 within the set of verification results $148_S$. The relationship may refer to the relation between metric(s) 212 that represent false accept events and metric(s) 212 the represent false reject events. To illustrate, the scorer 220 may generate the score 222 by merging false accept events (i.e., false accept errors) and false reject events (i.e., false reject errors) into a single cost that the scorer 220 converts into the score 222. In some implementations, the score 222 refers to a cost function that is a weighted combination of false accept events and false reject events. In some configurations, the amount of false accept events and/or false reject events may result in the scorer 220 being able to identify a probability for a false accept event and/or a false reject event occurring at the verification model 146. Here, the score 222 for the model 146 may be equal to a first cost coefficient (also referred to as a weight) multiplied by a probability of a false accept event combined (e.g., added to) with a second cost coefficient multiplied by a probability of a false reject event. In other approaches, the cost that forms the score 222 may be represented as a false accept cost component combined with a false reject cost component where each cost component is represented as a cost weight assigned to the false event multiple by a probability of the same speaker and a probability of the false event. Although these are some examples of algorithms for the scorer 220 to generate the score 222, other algorithms that represent a relationship between metrics 212 may be used to generate the score 222.

The scorer 220 communicates the performance metric score(s) 222 to the comparator 230 such that the comparator 230 may determine whether the verification capability of a verification model 146 (e.g., a production verification model 146a) is better than another verification model 146 (e.g., an experimental verification model 146b). In order to perform this determination, the comparator 230 compares the scores 222 for the same performance metric 212 between models 146. For instance, FIG. 2A depicts the comparator 230 comparing a first performance metric score 222a of a first performance metric 212 for the first model 146a with a first performance metric score 222a of a first performance metric 212 for the second model 146b. The comparator 230 may be configured to compare a single performance metric score 222 across two or more models 146 or to compare multiple performance metrics scores 222 at once across two or more models 146. When the analyzer 200 uses the comparator 230 to compare multiple performance metrics scores 222 at once across two or more models 146, the analyzer 200 may provide some indication of importance for each type of performance metric 212. For instance, the analyzer 200 applies a weight to each type of performance metric score 222 to indicate its overall importance to the verification capability for a verification process.

With continued reference to FIGS. 2A and 2B, in some configurations, the comparator 230 is configured to generate a performance comparison 202 that indicates whether one model 146 outperforms another model 146. For instance, in FIG. 2A, the comparator 230 is comparing two models 146a-b (e.g., a primary verification model 146a and an alternative verification model 146b) while, in FIG. 2B, the comparator 230 compares three models 146a-c (e.g., a primary or production verification model 146a, an alternative or experimental verification model 146b, and a control verification model 146c). In some examples, when the comparison indicates that the performance score(s) 222 of the second model 146b is better than the corresponding performance score(s) 222 of the first model 146a, the comparator 230 recommends replacing the first model 146a with the second model 146b. In some instances, instead of passively recommending this replacement, the analyzer 200 actually replaces the first model 146a with the second model 146b. To replace a model 146 with another model 146 (e.g., to replace the first model 146a with the second model 146b), the analyzer 200 may shift or reassign the number of users 10 or devices 110 that are assigned to each of model 146. For example, when replacing the production verification model 146 used by a majority of user devices 110, the analyzer 200 deploys the experimental verification model 146b instead to the majority of user devices 110 and discontinues that majority from using the original production verification model 146a. In some configurations, such as FIG. 2B, when the comparator 230 is comparing the performance scores 222 for more than two models 146, the analyzer 200 may set conditions as to when the analyzer 200 will recommend replacing or will actively replace a model 146. For instance, in the situation of three models 146a-c with a production verification model 146a, an experimental verification model 146b, and a control verification model 146c, the analyzer 200 sets a condition that the experimental verification model 146b needs to have a performance (based on performance metric scores 222) that exceeds each of the other models 146 (e.g., exceeds the production verification model 146a and the control verification model 146c).

Figure 3:
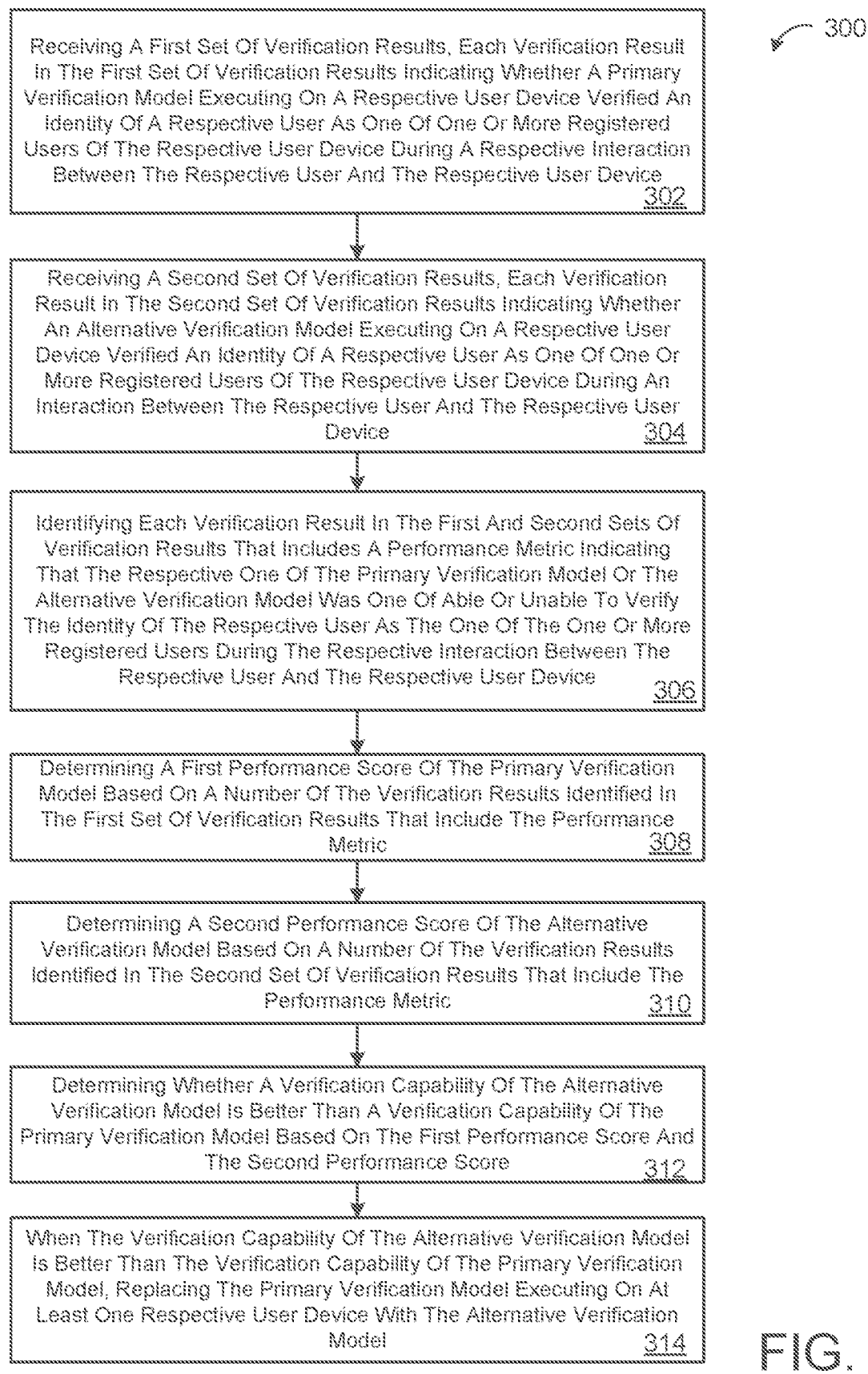
FIGS. 3 and 4 are flow charts of an example arrangements of operations for methods of evaluating the performance of a verification model.

FIG. 3 is a flowchart of an example arrangement of operations for a method 300 of evaluating the performance of a verification model 146. At operation 302, the method 300 receives a first set of verification results 148, $148_{S1}$ where each verification result 148 in the first set of verification results 148, $148_{S1}$ indicates whether a primary verification model 146, 146a executing on a respective user device 110 verifies an identity of a respective user 10 as one of one or more registered users $10_E$ of the respective user device 110 during a respective interaction between the respective user 10 and the respective user device 110. At operation 304, the method 300 also includes receiving a second set of verification results 148, $148_{S2}$ where each verification result 148 in the second set of verification results 148, $148_{S2}$ indicates whether an alternative verification model 146, 146b executing on a respective user device 110 verifies an identity of a respective user 10 as one of one or more registered users $10_E$ of the respective user device 110 during an interaction between the respective user 10 and the respective user device 110. At operation 306, the method 300 identifies each verification result 148 in the first and second sets of verification results $148_{S1}$, $148_{S2}$ that includes a performance metric 212 indicating that the respective one of the primary verification model 146, 146a or the alternative verification model 146, 146b was one of able or unable to verify the identity of the respective user 10 as the one of the one or more registered users $10_E$ during the respective interaction between the respective user 10 and the respective user device 110. At operation 308, the method 300 determines a first performance score 222, 222a of the primary verification model 146, 146a based on a number of the verification results 148 identified in the first set of verification results $148_{S1}$ that include the performance metric 212. At operation 310, the method 300 determines a second performance score 222, 222a of the alternative primary verification model 146, 146b based on a number of the verification results 148 identified in the second set of verification results $148_{S2}$ that include the performance metric 212. At operation 312, the method 300 determines whether a verification capability of the alternative verification model 146, 146b is better than a verification capability of the primary verification model 146, 146a based on the first performance score 222, 222a and the second performance score 222, 222a. At operation 314, when the verification capability of the alternative verification model 146, 146b is better than the verification capability of the primary verification model 146, 146a, the method 300 replaces the primary verification model 146, 146a executing on at least one respective user device 110 with the alternative verification model 146, 146b.

Figure 4:
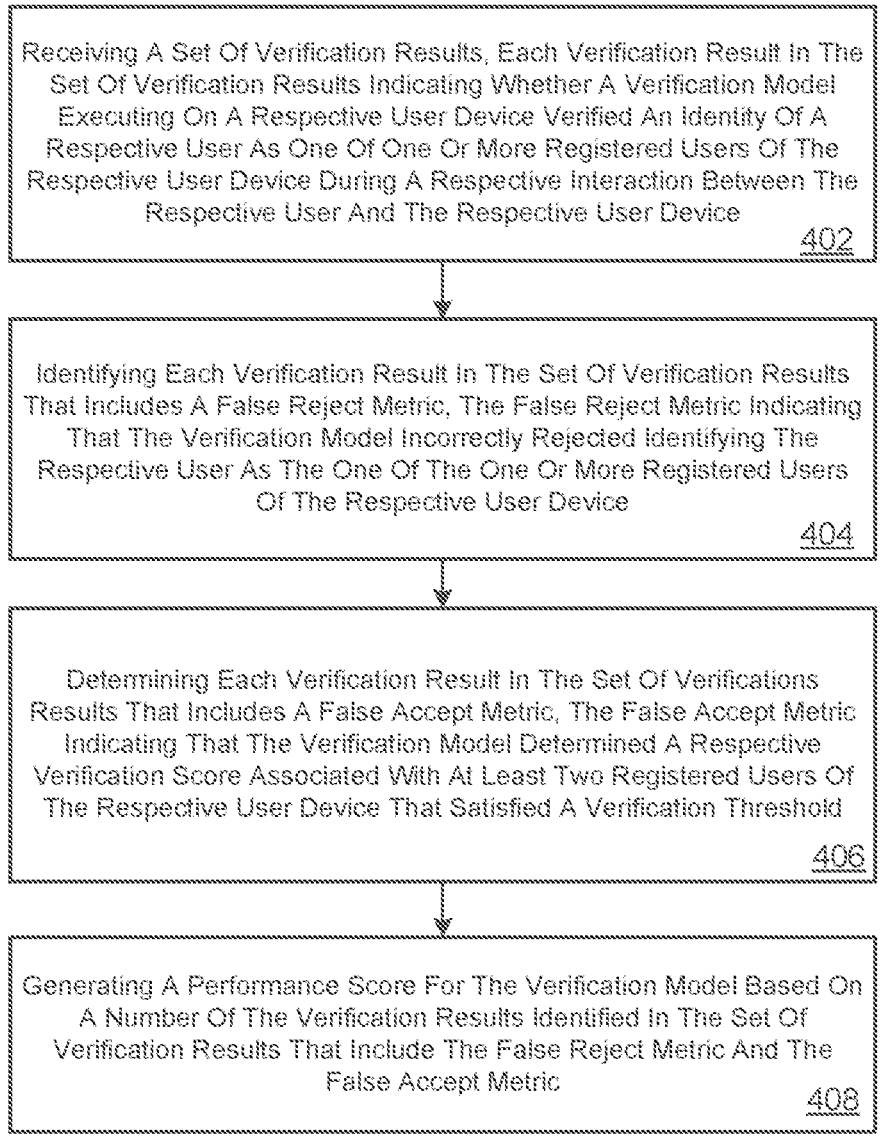

FIG. 4 is a flowchart of another example arrangement of operations for a method 400 of evaluating the performance of a verification model 146. At operation 402, the method 400 receives a set of verification results 148, $148_{S1}$ where each verification result 148 in the set of verification results 148, $148_S$ indicates whether a verification model 146 executing on a respective user device 110 verifies an identity of a respective user 10 as one of one or more registered users $10_E$ of the respective user device 110 during a respective interaction between the respective user 10 and the respective user device 110. At operation 404, the method 400 identifies each verification result 148 in the sets of verification results $148_S$ that includes a false reject metric 212 indicating that the verification model 146 incorrectly rejected identifying the respective user 10 as the one of the one or more registered users $10_E$ of the respective user device 110. At operation 406, the method 400 determines each verification result 148 in the sets of verification results $148_S$ that includes a false accept metric 212. The false accept metric 212 indicates that the verification model 146 determined a respective verification score associated with at least two registered users $10_E$ of the respective user device 110 that satisfied a verification threshold. At operation 408, the method 400 generates a performance score 222 for the verification model 146 based on a number of the verification results 148 identified in the set of verification results 148, $148_S$ that include the false reject metric 212 and the false accept metric 212.

Figure 5:
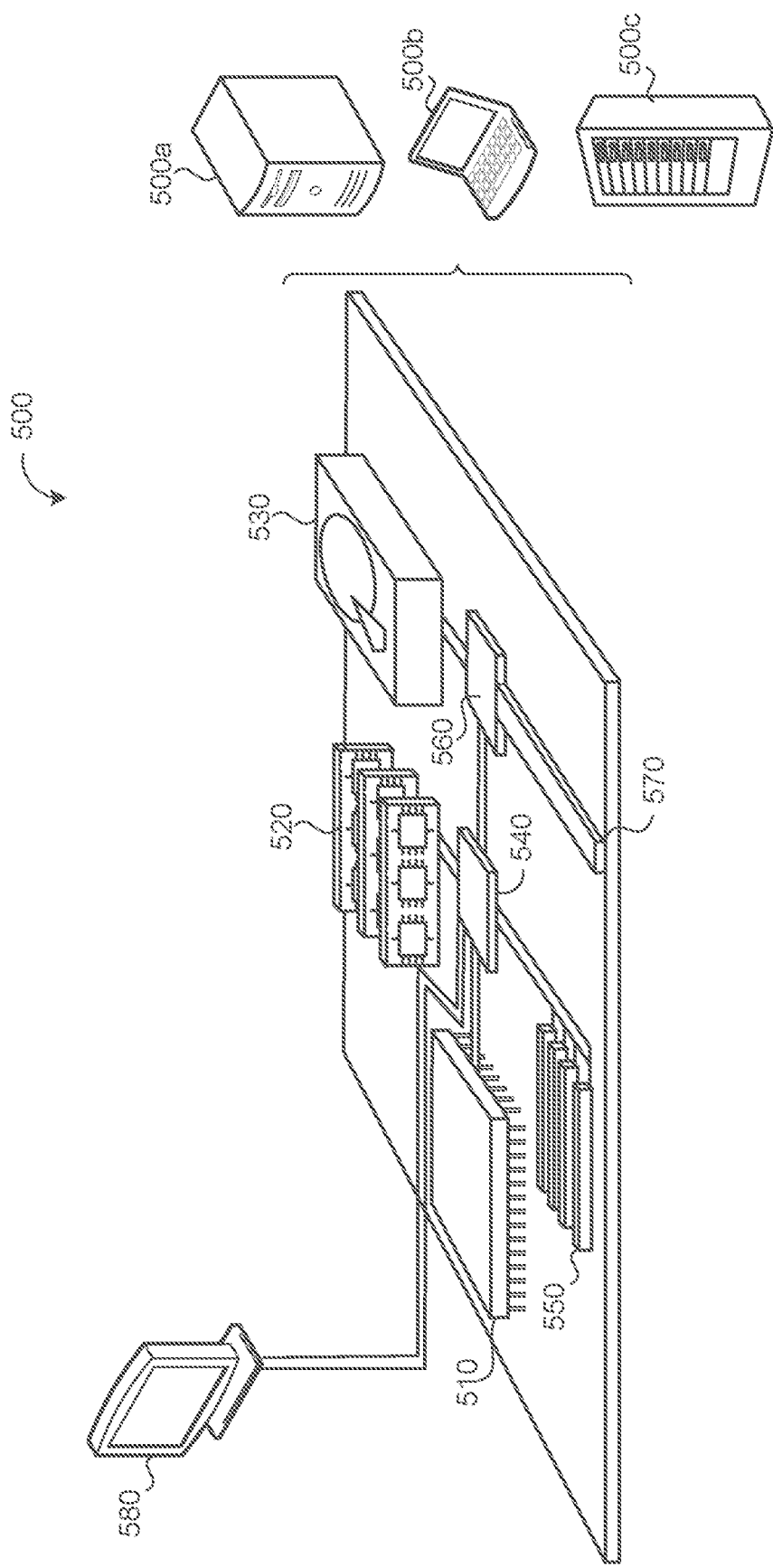
FIG. 5 is a schematic view of an example computing device that may be used to implement the systems and methods described herein.

FIG. 5 is schematic view of an example computing device 500 that may be used to implement the systems (e.g., the verification system 140 and/or the analyzer 200) and methods (e.g., the methods 300, 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
  receiving, at data processing hardware, a first set of verification results, each verification result in the first set of verification results indicating whether a primary verification model executing on a respective user device verified an identity of a respective user as one of one or more registered users of the respective user device during a respective interaction between the respective user and the respective user device;
  receiving, at the data processing hardware, a second set of verification results, each verification result in the second set of verification results indicating whether an alternative verification model executing on a respective user device verified an identity of a respective user as one of one or more registered users of the respective user device during an interaction between the respective user and the respective user device;

identifying, by the data processing hardware, each verification result in the first and second sets of verification results that includes a performance metric indicating that the respective one of the primary verification model or the alternative verification model was one of able or unable to verify the identity of the respective user as the one of the one or more registered users during the respective interaction between the respective user and the respective user device;

determining, by the data processing hardware, a first performance score of the primary verification model based on a number of the verification results identified in the first set of verification results that include the performance metric, the first performance score representing a performance of the primary verification model on the first set of verification results;

determining, by the data processing hardware, a second performance score of the alternative verification model based on a number of the verification results identified in the second set of verification results that include the performance metric, the second performance score representing a performance of the alternative verification model on the second set of verification results;

determining, by the data processing hardware, whether a verification capability of the alternative verification model is better than a verification capability of the primary verification model based on the first performance score and the second performance score; and when the verification capability of the alternative verification model is better than the verification capability of the primary verification model, replacing, by the data processing hardware, the primary verification model executing on at least one respective user device with the alternative verification model and discontinuing execution of the primary verification model on the at least one respective user device.

2. The method of claim 1, further comprising:

receiving, at the data processing hardware, a third set of verification results, each verification result in the third set of verification results indicating whether a control verification model executing on a respective user device verified an identity of a respective user as one of one or more registered users of the respective user device during a respective interaction between the respective user and the respective user device;

identifying, by the data processing hardware, each verification result in the third set of verification results that include the performance metric indicating that the control verification model was the one of able or unable to verify the identity of the respective user during the respective interaction between the respective user and the respective user device;

determining, by the data processing hardware, a third performance score of the control verification model based on a number of the verification results identified in the third set of verification results that include the performance metric; and determining, by the data processing hardware, whether the verification capability of the alternative verification model is better than the verification capability of the control verification model based on the second performance score and the third performance score, wherein replacing the primary verification model executing on each respective user device with the alternative verification model comprises replacing the primary verification model executing on each respective user device with the alternative verification model when the verification capability of the alternative verification model is better than the verification capabilities of both the primary verification model and the control verification model.

3. The method of claim 1, further comprising:

initially assigning, by the data processing hardware, the primary verification model to execute on a first plurality of user devices and the alternative verification model to execute on a second plurality of user devices, wherein replacing the primary verification model executing on at least one respective user device comprises reassigning the alternative verification model to execute on at least one respective user device in the first plurality of user devices in place of the primary verification model.

4. The method of claim 3, wherein the first plurality of user devices is greater than the second plurality of user devices.

5. The method of claim 1, wherein none of the verification results received in the first and second sets of verification results comprise a user identifier identifying the respective user.

6. The method of claim 1, wherein none of the verification results received in the first and second sets of verification results comprise audio data associated with the respective interaction between the respective user and the respective user device.

7. The method of claim 1, wherein:

the primary verification model is trained on a first set of training data; and the alternative verification model is trained on a second set of training data different than the first set of training data.

8. The method of claim 1, wherein the primary verification model comprises a first neural network and the alternative verification model comprises a second neural network having a different neural network architecture than the first neural network.

9. The method of claim 1, wherein the performance metric comprises a false reject metric indicating that the respective one of the primary verification model or the alternative verification model incorrectly rejected identifying the respective user as the one of the one or more registered users of the respective user device.

10. The method of claim 9, wherein the false reject metric comprises one of:

a punt metric indicating that the respective one of the primary verification model or the alternative verification model authorized the respective user for guest privileges during the respective interaction with the respective user device;

a double punt metric indicting that the respective one of the primary verification model or the alternative verification model authorized the respective user for guest privileges during the respective interaction with the respective user device immediately subsequent to authorizing the same respective user for guest privileges during a previous respective interaction with the respective user device; and a punt and re-ask metric indicating that the respective one of the primary verification model or the alternative verification model authorized the respective user for guest privileges during the respective interaction with the respective user device when the respective interaction corresponds to the respective user requesting authorized privileges immediately after the respective one of the primary verification model or the alternative verification model authorized the same respective user for guest privileges during a previous respective interaction with the respective user device.

11. The method of claim 1, wherein the performance metric comprises a false accept metric indicating that the respective one of the primary verification model or the alternative verification model incorrectly accepted the respective user as the one of the one or more registered users of the respective user device.

12. The method of claim 11, wherein the false accept metric comprises a proxy imposter acceptance metric indicating that the respective one of the primary verification model or the alternative verification model determined a respective verification score associated with at least two registered users of the respective user device that satisfied a verification threshold.

13. A system comprising:
data processing hardware; and
memory hardware in communication with the data processing hardware, the memory hardware storing instructions that when executed on the data processing hardware cause the data processing hardware to perform operations comprising:
receiving a first set of verification results, each verification result in the first set of verification results indicating whether a primary verification model executing on a respective user device verified an identity of a respective user as one of one or more registered users of the respective user device during a respective interaction between the respective user and the respective user device;
receiving a second set of verification results, each verification result in the second set of verification results indicating whether an alternative verification model executing on a respective user device verified an identity of a respective user as one of one or more registered users of the respective user device during an interaction between the respective user and the respective user device;
identifying each verification result in the first and second sets of verification results that includes a performance metric indicating that the respective one of the primary verification model or the alternative verification model was one of able or unable to verify the identity of the respective user as the one of the one or more registered users during the respective interaction between the respective user and the respective user device;
determining a first performance score of the primary verification model based on a number of the verification results identified in the first set of verification results that include the performance metric, the first performance score representing a performance of the primary verification model on the first set of verification results;
determining a second performance score of the alternative verification model based on a number of the verification results identified in the second set of verification results that include the performance metric, the second performance score representing a performance of the alternative verification model on the second set of verification results;
determining whether a verification capability of the alternative verification model is better than a verification capability of the primary verification model based on the first performance score and the second performance score; and
when the verification capability of the alternative verification model is better than the verification capability of the primary verification model, replacing the primary verification model executing on at least one respective user device with the alternative verification model and discontinuing execution of the primary verification model on the at least one respective user device.

14. The system of claim 13, wherein the operations further comprise:
receiving a third set of verification results, each verification result in the third set of verification results indicating whether a control verification model executing on a respective user device verified an identity of a respective user as one of one or more registered users of the respective user device during a respective interaction between the respective user and the respective user device;
identifying each verification result in the third set of verification results that include the performance metric indicating that the control verification model was the one of able or unable to verify the identity of the respective user during the respective interaction between the respective user and the respective user device;
determining a third performance score of the control verification model based on a number of the verification results identified in the third set of verification results that include the performance metric; and
determining whether the verification capability of the alternative verification model is better than the verification capability of the control verification model based on the second performance score and the third performance score,
wherein replacing the primary verification model executing on each respective user device with the alternative verification model comprises replacing the primary verification model executing on each respective user device with the alternative verification model when the verification capability of the alternative verification model is better than the verification capabilities of both the primary verification model and the control verification model.

15. The system of claim 13, wherein the operations further comprise:
initially assigning the primary verification model to execute on a first plurality of user devices and the alternative verification model to execute on a second plurality of user devices,
wherein replacing the primary verification model executing on at least one respective user device comprises reassigning the alternative verification model to execute on at least one respective user device in the first plurality of user devices in place of the primary verification model.

16. The system of claim 15, wherein the first plurality of user devices is greater than the second plurality of user devices.

17. The system of claim 13, wherein none of the verification results received in the first and second sets of verification results comprise a user identifier identifying the respective user.

18. The system of claim 13, wherein none of the verification results received in the first and second sets of verification results comprise audio data associated with the respective interaction between the respective user and the respective user device.

19. The system of claim 13, wherein:
the primary verification model is trained on a first set of training data; and
the alternative verification model is trained on a second set of training data different than the first set of training data.

20. The system of claim 13, wherein the primary verification model comprises a first neural network and the alternative verification model comprises a second neural network having a different neural network architecture than the first neural network.

21. The system of claim 13, wherein the performance metric comprises a false reject metric indicating that the respective one of the primary verification model or the alternative verification model incorrectly rejected identifying the respective user as the one of the one or more registered users of the respective user device.

22. The system of claim 21, wherein the false reject metric comprises one of:
a punt metric indicating that the respective one of the primary verification model or the alternative verification model authorized the respective user for guest privileges during the respective interaction with the respective user device;
a double punt metric indicting that the respective one of the primary verification model or the alternative verification model authorized the respective user for guest privileges during the respective interaction with the respective user device immediately subsequent to authorizing the same respective user for guest privileges during a previous respective interaction with the respective user device; and
a punt and re-ask metric indicating that the respective one of the primary verification model or the alternative verification model authorized the respective user for guest privileges during the respective interaction with the respective user device when the respective interaction corresponds to the respective user requesting authorized privileges immediately after the respective one of the primary verification model or the alternative verification model authorized the same respective user for guest privileges during a previous respective interaction with the respective user device.

23. The system of claim 13, wherein the performance metric comprises a false accept metric indicating that the respective one of the primary verification model or the alternative verification model incorrectly accepted the respective user as the one of the one or more registered users of the respective user device.

24. The system of claim 23, wherein the false accept metric comprises a proxy imposter acceptance metric indicating that the respective one of the primary verification model or the alternative verification model determined a respective verification score associated with at least two registered users of the respective user device that satisfied a verification threshold.

* * * * *